(12) United States Patent
Luka et al.

(10) Patent No.: US 7,846,329 B2
(45) Date of Patent: *Dec. 7, 2010

(54) LIQUID FILTER

(75) Inventors: Helmut Luka, Marbach (DE); Dieter Schreckenberger, Marbach (DE); Rainer Loos, Freiberg (DE); Markus Kolczyk, Mundelsheim (DE)

(73) Assignee: Mann+Hummel GmbH, Ludwigsburg (DE)

( * ) Notice: Subject to any disclaimer, the term of this patent is extended or adjusted under 35 U.S.C. 154(b) by 988 days.

This patent is subject to a terminal disclaimer.

(21) Appl. No.: 11/300,403

(22) Filed: Dec. 15, 2005

(65) Prior Publication Data
US 2006/0131225 A1    Jun. 22, 2006

(30) Foreign Application Priority Data
Dec. 16, 2004   (DE) ................. 10 2004 061 108

(51) Int. Cl.
*B01D 27/08* (2006.01)
*B01D 27/10* (2006.01)

(52) U.S. Cl. .............. 210/232; 210/136; 210/440; 210/443; 210/444; 210/450

(58) Field of Classification Search ................. 210/232, 210/136, DIG. 17, 440, 443, 444, 450
See application file for complete search history.

(56) References Cited

U.S. PATENT DOCUMENTS

| 2,877,902 A | * | 3/1959 | Chase et al. ................ 210/440 |
| 2,888,141 A | | 5/1959 | Coates et al. |
| 2,894,630 A | * | 7/1959 | Humbert, Jr. ............... 210/133 |
| 2,995,249 A | | 8/1961 | Boewe et al. |
| 3,000,506 A | * | 9/1961 | Hultgren ..................... 210/133 |
| 3,184,062 A | * | 5/1965 | Humbert, Jr. ............... 210/130 |
| 3,724,665 A | * | 4/1973 | Hall ........................... 210/130 |
| 4,324,660 A | * | 4/1982 | Peyton et al. ............... 210/440 |

FOREIGN PATENT DOCUMENTS

DE   1 611 120 A1   10/1970

OTHER PUBLICATIONS

European Search Report with partial English translation dated Jan. 14, 2009 (Seven (7) pages).

* cited by examiner

*Primary Examiner*—Thomas M Lithgow

(57) ABSTRACT

A replaceable liquid filter, particularly for the lubricating oil of an internal combustion engine, having a substantially cup-shaped housing with a concentrically disposed outlet opening for the filtered liquid and at least one inlet opening for the liquid to be filtered and a filter element sealingly disposed between the inlet opening and the outlet opening. The housing is connected to a top plate, and the top plate is connected to an end plate. A connector for releasably coupling the replaceable liquid filter to a mating part is disposed concentrically in the region of the cover plate, such that the connector extends axially beyond the contour of the replaceable liquid filter.

12 Claims, 4 Drawing Sheets

LIQUID FILTER

BACKGROUND OF THE INVENTION

The invention relates to a liquid filter, particularly an oil filter for an internal combustion engine, comprising a housing with a concentrically disposed outlet opening for filtered liquid and at least one inlet opening for the liquid to be filtered, and a filter element sealingly disposed between the inlet opening and the outlet opening.

In the prior art, oil cartridge filters, also referred to as spin-on filters, are frequently used. These replaceable oil filters are preferably screwed directly onto the cylinder head of an internal combustion engine and are thus integrated into the oil circuit of the engine. To this end, an internal thread is provided in the cylinder head of the internal combustion engine into which a threaded nipple is firmly screwed having an external thread extending axially away from the cylinder head. The oil cartridge filter, comprising a cup-shaped housing and an end plate with a thread disposed concentrically therein, is in turn screwed onto this threaded nipple which is screwed into the cylinder head. It is necessary to use a threaded nipple because of production and material related difficulties that make it impractical to form an external thread directly on the cylinder head.

A drawback of this arrangement is that two pairs of threads must be used, namely, the cylinder head/threaded nipple thread pair on the one hand and the threaded nipple/oil cartridge filter thread pair on the other. This increases the possibility of leakage problems and also has drawbacks with regard to the diameter available for the outlet in the threaded interior. Another drawback is the relatively high cost of the threaded nipple.

SUMMARY OF THE INVENTION

It is therefore an object of the present invention to provide an improved replaceable liquid filter.

Another object of the invention is to provide a replaceable oil filter which does not need two pairs of threads for mounting.

A further object of the invention is to provide a replaceable liquid filter which is less prone to leakage.

It is also an object of the invention to provide a replaceable liquid filter which and is simple and cost-effective to manufacture.

These and other objects are achieved in accordance with the present invention by providing a replaceable liquid filter comprising a substantially cup-shaped housing with a concentrically disposed outlet opening for filtered liquid and at least one inlet opening for liquid to be filtered, and a filter element disposed in a sealing manner between the inlet opening and the outlet opening, the housing being connected to a top plate, and the top plate being attached to an end plate, wherein a connector which extends axially beyond the contour of the replaceable liquid filter is disposed concentrically in the area of the end plate for releasably connecting the replaceable liquid filter to a mating part.

The invention thus relates to a replaceable liquid filter, particularly for the lubricating oil of an internal combustion engine, which has a substantially cup-shaped housing with a concentrically disposed outlet opening for the filtered liquid and at least one inlet opening for the liquid to be filtered. A preferably zigzag-shaped pleated round filter element is sealingly disposed between the inlet opening and the outlet opening. The housing is connected to a top plate, and the top plate is connected to a cover plate or end plate. The top plate is preferably connected to the cup-shaped housing via a crimped edge. Furthermore, the top plate is preferably connected to the end plate by a form-fitting or interlocking connection. A connector for releasably coupling the replaceable liquid filter to a mating part is disposed concentrically in the area of the cover plate such that the connector extends axially beyond the contour of the replaceable liquid filter. This solution has the advantage that the threaded nipple can be eliminated. The connection between the replaceable liquid filter and the cylinder head via the releasable connector may, for example, comprise a bayonet-type connection, a threaded connection, or some other connection type known in the art which is capable of withstanding temperature fluctuations and pressure pulsation.

According to one advantageous embodiment, the releasable connector comprises a concentric annular collar with an external thread. This concentric annular collar with the external thread can then be screwed directly into the internal thread of the cylinder head and thereby makes a threaded nipple superfluous. Eliminating the threaded nipple also has the advantage of simultaneously increasing the available diameter for the outlet opening for the filtered liquid.

To this end, the releasable connector may be formed integrally with the end plate, such that the end plate furthermore has at least one opening, which communicates with the at least one inlet opening. Preferably, the end plate is made of a deep-drawable metal, such that the annular collar is formed in the deep drawing process. In the radially outer region of the end plate, a plurality of openings are preferably spaced at regular intervals around the concentric annular collar, through which the liquid to be filtered can enter the replaceable liquid filter.

Alternatively, the releasable connector may be releasably or permanently attached to the end plate in a liquid-tight manner. For example, the releasable connector may be connected to the end plate by a threaded connection or by welded connection. This end plate embodiment also has at least one opening which communicates with the at least one inlet opening. The arrangement of the at least one inlet opening may be configured analogously to the above-described solution.

In accordance with another advantageous embodiment of the invention, a backflow check valve is disposed in the outlet opening in the area of the releasable connector, such that the backflow check valve is disposed axially outside the effective filter element surface. The backflow check valve prevents return flow of liquid and thus prevents the replaceable liquid filter from emptying when the internal combustion engine is stopped. The arrangement of the backflow check valve axially outside the effective filter element surface prevents the largest possible amount of liquid from flowing out of the cartridge filter. Advantageously, the arrangement of the connector extending axially beyond the contour of the liquid filter may be combined with the arrangement of the backflow check valve in precisely this region, thus providing a significant advantage over prior devices.

The backflow check valve advantageously comprises a compression spring for urging a valve member against a sealing face. A helical spring is preferred, which is supported against a correspondingly defined contour within the replaceable liquid filter and presses a valve member onto a sealing face or valve seat to create the seal. By varying the spring, it is possible to adjust a precise characteristic for opening and closing the valve.

As an alternative, the backflow check valve may also comprise a tension spring for urging a valve member against a sealing face. Through a kinematic reversal it is thus possible to use, for example, a tension-loaded spring, which also engages with a corresponding contour within the replaceable liquid filter, to press a valve member under tension against a sealing face or valve seat. Here, too, the operating characteristic of the valve may be influenced through appropriate selection of the spring.

It is advantageous if the top plate has a seal at its axially outer end to axially seal the joint between the replaceable liquid filter and the mating part to which it is attached, preferably a cylinder head. Preferably, some kind of a groove is formed in the top plate into which, for example, an O-ring or a cut square gasket is inserted, which creates an axial seal between the replaceable liquid filter and the mating part when the replaceable liquid filter is affixed to the mating part.

In accordance with yet another embodiment of the invention, the top plate encloses a displacement space. This displacement space, like the releasable connector, extends in the direction of the cylinder head and is disposed in an inlet chamber of the mating part, in this case the cylinder head. The inlet opening is then disposed in the top plate in the area of the displacement space. In the prior art, the cylinder head has a circumferential groove in the area of the inlet through which the oil is supplied to the replaceable liquid filter. In this embodiment, this groove space is almost completely taken up by the displacement space of the replaceable liquid filter, such that the largest possible volume is available in the replaceable liquid filter.

In accordance with yet another embodiment of the invention, a backflow check valve membrane is disposed in the displacement space such that the liquid cannot flow out of the replaceable liquid filter when the filter is removed. The backflow check valve membrane is preferably made of an elastic synthetic resin material (i.e., plastic) or rubber and is open when the internal combustion engine is running because of the pressure of the inflowing liquid. When the internal combustion engine is stopped, the backflow check valve membrane rests over the inlet openings and seals them. This solution is particularly advantageous in replaceable liquid filters that are positioned upright and in these cases prevents the liquid from flowing out of the replaceable liquid filter when the filter is replaced. Because the top plate forms the displacement space, the backflow check valve membrane also prevents the liquid within the displacement space from leaking out. Thus, this backflow check valve membrane in combination with the backflow check valve discussed above, prevents the liquid inside an upright replaceable liquid filter from leaking out during servicing.

The backflow check valve membrane is preferably permanently attached to the top plate. This may be effected, for example, by adhesive bonding or fusion welding or by some other method known in the art.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
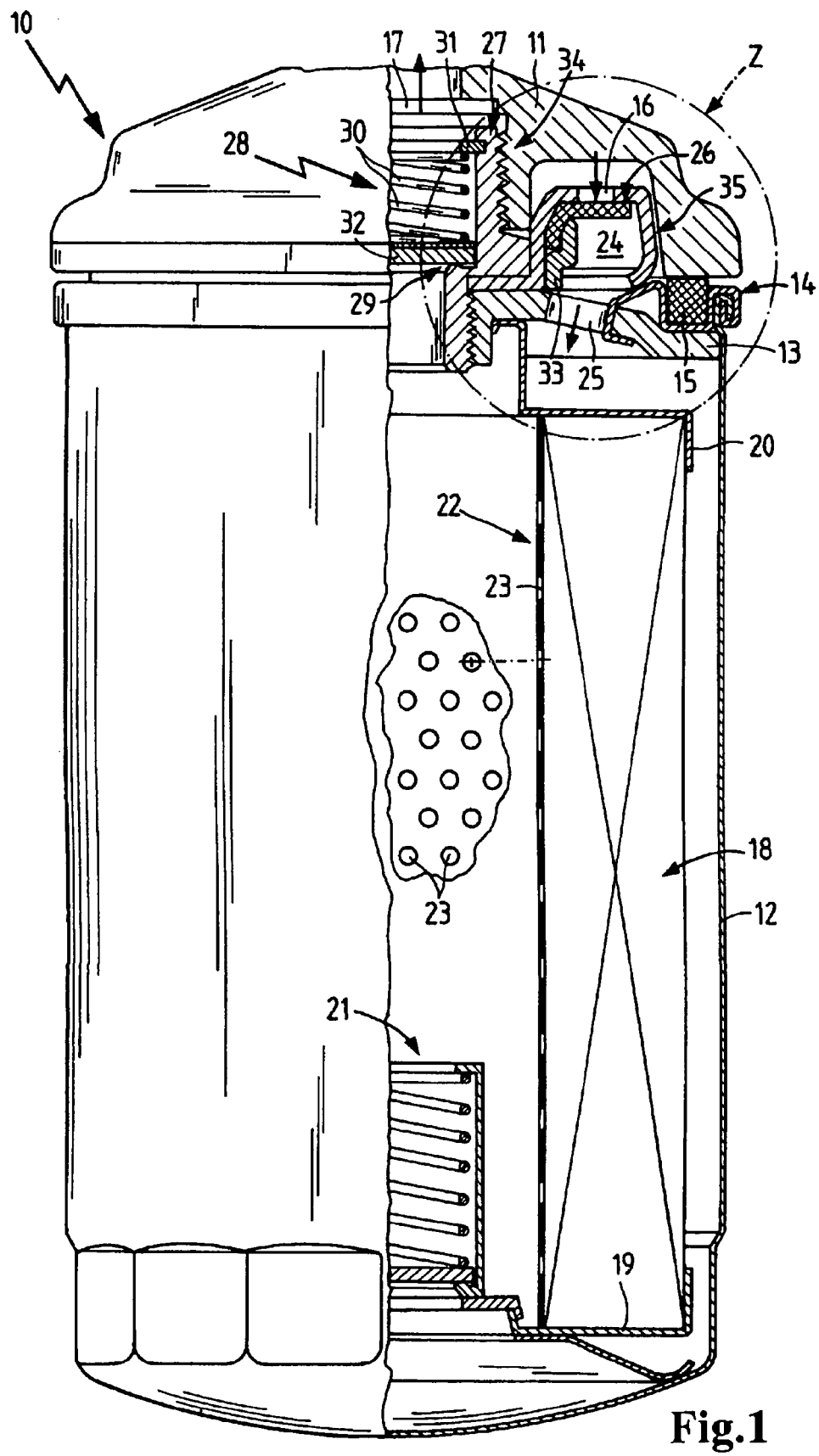
FIG. 1 is a partially sectional view of a replaceable liquid filter according to the invention.

FIG. 1 shows a replaceable liquid filter 10, which is mounted to a flange on a cylinder head 11. The replaceable liquid filter 10 comprises a cup-shaped housing 12 which is preferably made of metal but may also be made of synthetic resin material, i.e., plastic. In the area of the connection between the cylinder head 11 and the replaceable liquid filter 10, the replaceable liquid filter 10 has a cover plate 13, which is held in place by a top plate 14. The cup-shaped housing 12 is connected to the top plate 14 via a crimped edge, and the cover plate 13 is connected to the top plate 14 by some type of liquid-tight, form-fitting or interlocking connection. To seal the joint between the replaceable liquid filter 10 and the cylinder head 11, a square gasket 15 is disposed in a groove formed in the top plate 14. This square gasket 15 axially seals the replaceable liquid filter 10 relative to the cylinder head 11.

The replaceable liquid filter 10 further has an inlet opening 16 and an outlet opening 17, which are sealingly separated from one another by a filter element 18. The filter element 18 is preferably a hollow, cylindrical, zigzag-pleated filter element and comprises a lower end disk 19 and an upper end disk 20. Lower end disk 19 is provided with an integrated pressure regulating valve 21. If the filter element 18 is blocked or clogged, the pressure regulating valve opens to provide a direct passage from the unfiltered side to the filtered side and thus serves to bypass the filter element 18. This is a simple way to maintain oil flow prevent damage to the internal combustion engine if the filter becomes blocked or clogged.

A support tube 22 with openings 23 is disposed in the interior of the filter element 18 to stabilize the filter medium against pressure pulsation.

The end plate 13 and the top plate 14 furthermore include a volume contour 35, preferably made of metal, which includes the inlet opening 16 on the one hand and extends into the cylinder head 11 on the other. This creates a displacement space 24. The liquid to be filtered, particularly the lubricating oil of the internal combustion engine, flows from the cylinder head 11 and then flows through the inlet opening 16 into the displacement space 24 and from there via a passage 25 into the unfiltered liquid space of the replaceable liquid filter 10. In the displacement space 24, a backflow check valve membrane 26 is mounted via a holder 33. The backflow check valve membrane 26 is preferably made of a flexible, elastic plastic or rubber material and closes the opening 16 when the internal combustion engine is stopped.

A connecting collar 27 is disposed concentrically inside the replaceable liquid filter 10, in the region of the connection between the replaceable liquid filter 10 and the cylinder head 11. This connecting collar is firmly connected to the end plate 13 and the volume contour 35 and has an external thread in the region protruding beyond the replaceable liquid filter 10 to create a threaded connection 34 with the cylinder head 11.

A backflow check valve 28 is disposed in the interior of the connecting collar 27 in the area of the connection to the cylinder head 11. This backflow check valve 28 comprises a valve seat 29, a compression spring 30 held by mounts 31 acting as counterbearings and a valve disk 32, such that the valve disk 32 is urged against the valve seat 29 by the force of the compression spring 30 to create a tight seal when the internal combustion engine is stopped. The backflow check valve 28 is integrated directly into the outlet opening 17 of the replaceable liquid filter 10 and is likewise intended to prevent the filter from emptying when the internal combustion engine is stopped. Disposing the backflow check valve 28 in the outlet opening 17 and the backflow check valve membrane 26 within the displacement space 24 has the advantage that if an upright replaceable liquid filter 10 is used, no oil can leak out of the replaceable liquid filter when it is removed for servicing, so that contamination of the surroundings and/or the environment is avoided.

Figure 2:
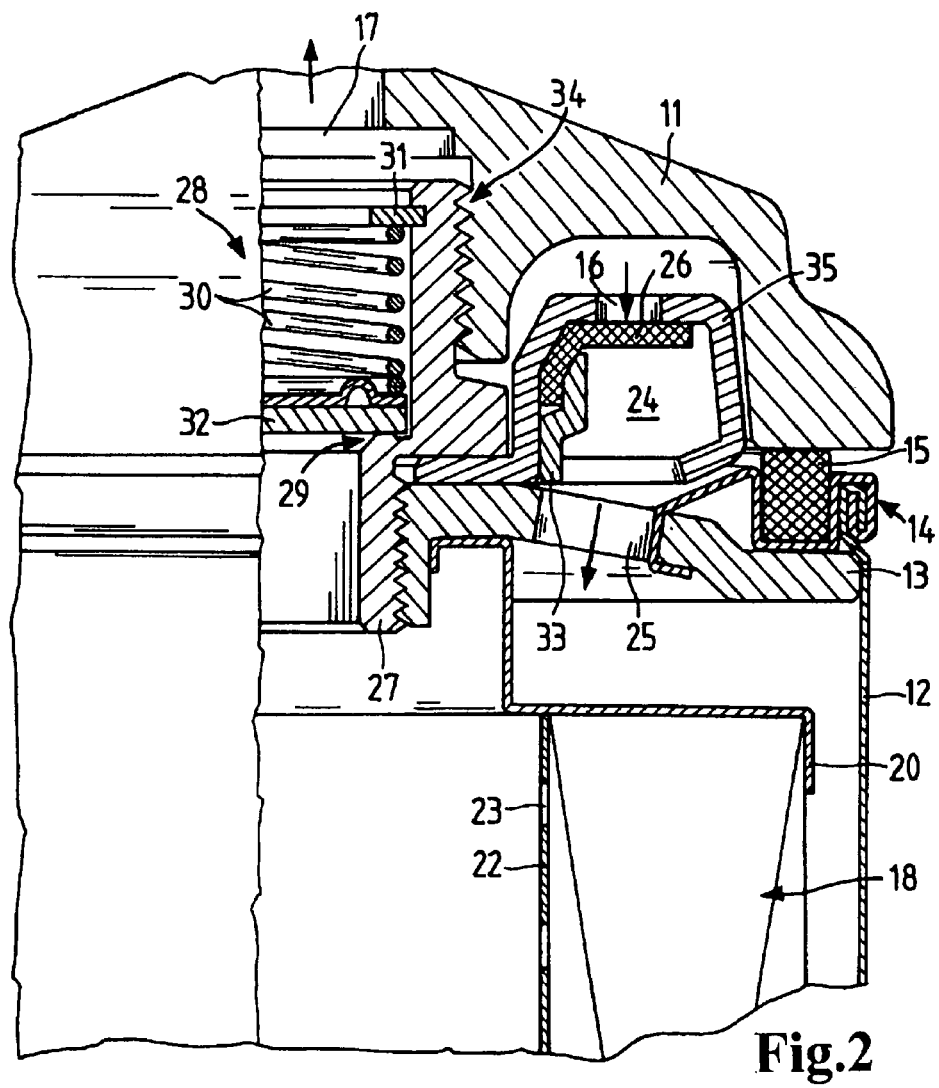
FIGS. 2 through 10 are detail views of alternative embodiments of the area of the replaceable liquid filter identified by the letter Z in FIG. 1.

FIG. 2 shows an enlargement of the area identified by the letter Z in FIG. 1. In this enlarged view it can be more easily seen how the compression spring 30 is held by the mounts 31 formed on the connecting collar 27 which act as counterbearings for the spring, and how the spring urges the valve disk 32 against the valve seat 29.

FIGS. 3 to 10 show the detail area Z of alternative embodiments of the invention. In each of these figures like elements are identified by the same reference numerals.

Figure 3:
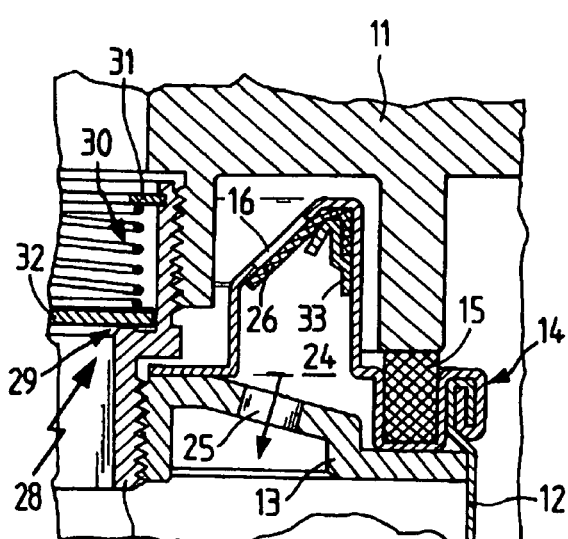

FIG. 3 shows a variant in which the inlet opening 16 is not disposed parallel to the filter element 18, but instead is arranged at an approximately 45 degree angle thereto. The other elements of the device correspond to those of FIGS. 1 and 2. This angled placement of the inlet opening 16 has the advantage that the holder 33 for the backflow check valve membrane 26 may be constructed as a clamping ring or alternatively even be injection molded onto the backflow check valve membrane. This also protects the backflow check valve membrane 26 if the liquid flowing in through the cylinder head 11 does not strike the backflow check valve membrane 26 directly but at an angle.

Figure 4:
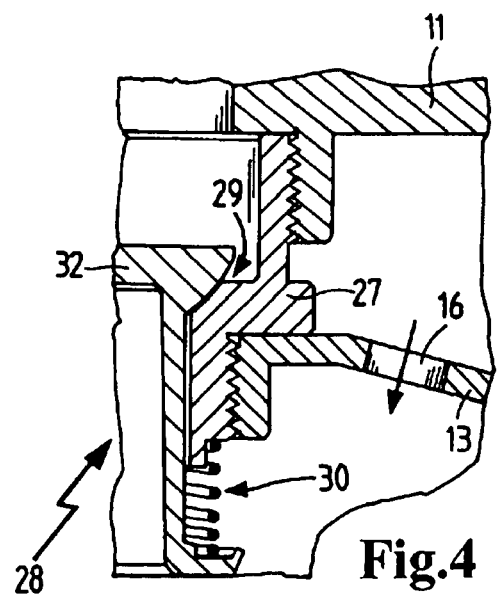

FIG. 4 shows an alternative arrangement of the backflow check valve 28. In this embodiment, the valve seat 29 is formed on the connecting collar 27, and due to opposite arrangement of the compression spring 30, the valve disk 32 is pulled instead of pushed against the valve seat 29.

Figure 5:
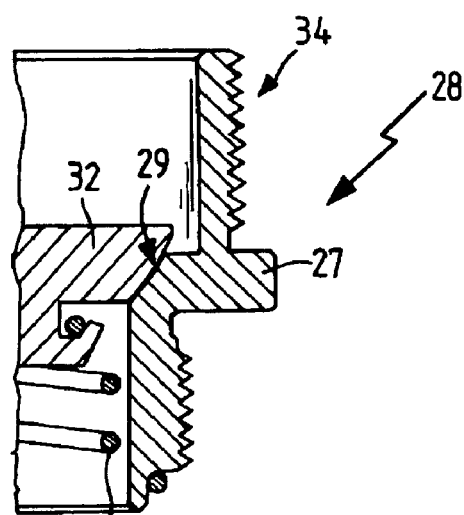

FIG. 5 shows another optional configuration for the backflow check valve 28. In this embodiment, the valve disk 32 is pulled against the valve seat 29 by a tension spring 36. The valve seat 29 is again positioned in the connecting collar 27, and the tension spring 36 is also anchored on the connecting collar 27.

Figure 6:
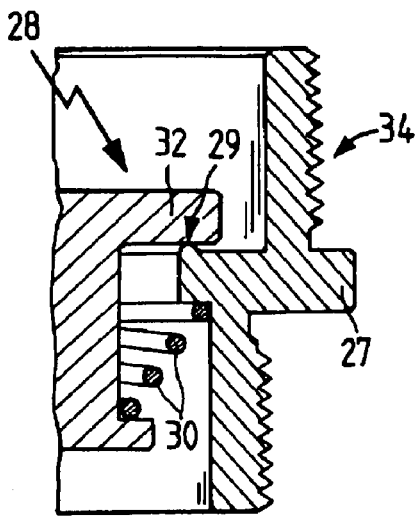

The valve disk 32 of FIG. 6 is pushed against the valve seat 29 and simultaneously centered by a conical compression spring 30. The valve seat 29 is again formed on the connecting collar 27.

Figure 7:
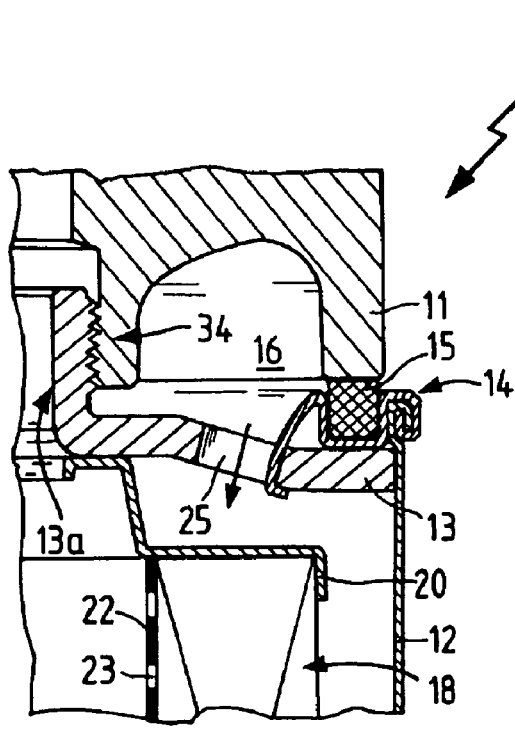

FIG. 7 shows a variation in which the connecting collar 27 is formed through a special embodiment of the end plate 13. Because the displacement space 24 is not used here, the inlet opening 16 is formed in the end plate 13. The end plate 13 is preferably deep-drawn such that a concentric annular collar 13a is formed in its interior and can then engage with the cylinder head 11 via a threaded connection 34.

Figure 8:
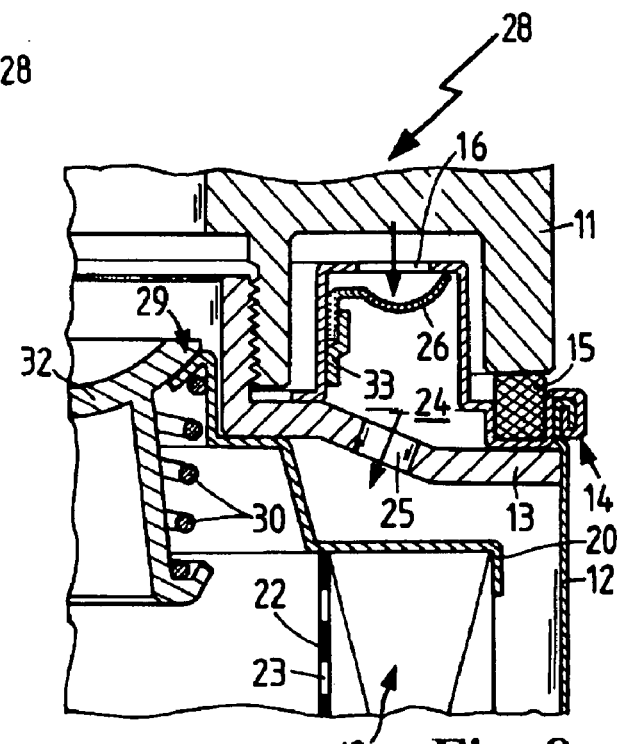

In FIG. 8 the top plate 14 forms the displacement space 24. The inlet opening 16 is then formed in the top plate 14, and a backflow check valve membrane 26 is again disposed on the top plate 14 via the mounting member 33. The liquid coming from the cylinder head 11 thus flows through the inlet opening 16 into the displacement space 24 and from there through the passage 25 in the end plate 13 into the unfiltered liquid space of the replaceable liquid filter 10. In this embodiment, the counterbearing for the compression spring 30 of the backflow check valve 28 is formed by the upper end disk 20 of the filter element 18. At the same time, the end disk 20 also forms the valve seat 29 for the valve disk 32.

Figure 9:
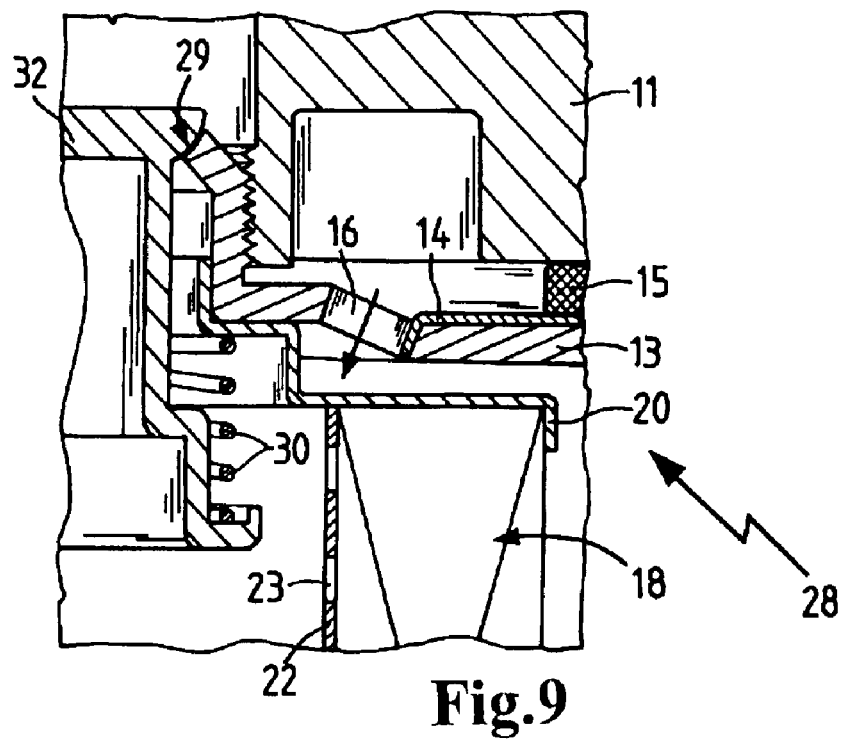

Alternatively, As shown in FIG. 9, the valve seat 29 alternatively may be formed by a suitable configuration of the end plate 13, such that the upper end disk 20 acts only as a counterbearing for the compression spring 30. The sealing face of the backflow check valve 28 is formed by the valve seat 29 on the end plate and the valve disk 32.

Figure 10:
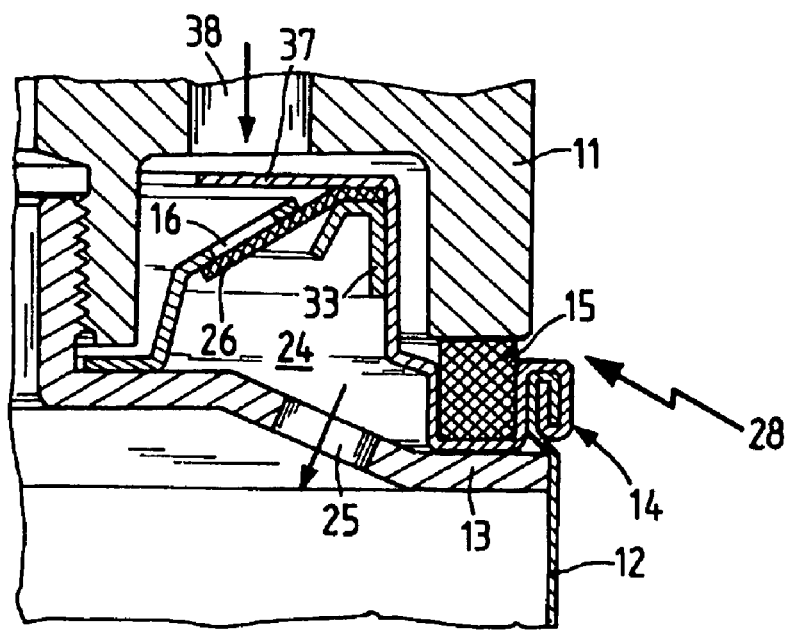

To protect the backflow check valve membrane 26, it is also possible to form a baffle plate 37 as part of the top plate 14 as shown in FIG. 10 to cover the backflow check valve membrane 26 over a certain area and thereby prevent direct contact between the inflowing liquid and the backflow check valve membrane 26. In this figure it may be seen that in the absence of this baffle plate 37, the liquid flowing through the inlet opening 38 formed in the cylinder head 11 would impinge directly against the backflow check valve membrane 26.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A replaceable liquid filter comprising
a substantially cup-shaped housing with a concentrically disposed outlet opening for filtered liquid, and
a filter element disposed in a sealing manner between the inlet opening and the outlet opening,
said housing being connected to a top plate, and
the top plate being attached to an end plate, said end plate having at least one inlet opening for liquid to be filtered,
wherein a releasable connector which extends axially beyond a contour of the housing of the replaceable liquid filter is disposed concentrically in the area of the end plate for releasably connecting the replaceable liquid filter to a mating part,
wherein said end plate includes a volume contour member having a contour member inlet aperture;
wherein the top plate with said volume contour member and the end plate define an enclosed displacement space, extending axially beyond the contour of the filter housing, for disposing in an inlet chamber of the mating part, such that the inlet opening in the end plate is disposed in the area of the displacement space, such that said contour member inlet aperture provides inlet fluid flow to said displacement space to reach said inlet opening.

2. A filter according to claim 1, wherein the releasable connector comprises a concentric annular collar with an external thread.

3. A filter according to claim 1, wherein the releasable connector is integrally formed on the end plate, and the end plate has at least one opening which communicates with the at least one inlet opening.

4. A filter according to claim 1, wherein the releasable connector is connected to the end plate in a liquid-tight manner, and the end plate is provided with at least one opening which communicates with the at least one inlet opening.

5. A filter according to claim 4, wherein the releasable connector is permanently connected to the end plate.

6. A filter according to claim 1, wherein a backflow check valve is disposed in the outlet opening in the area of the releasable connector, and said the backflow check valve is disposed axially outside the effective filter element surface.

7. A filter according to claim 6, wherein
the backflow check valve comprises:
a valve seat provided on an interior portion of said annular collar;

a valve disk having a sealing face arranged downstream of said valve seat, said valve seat and said sealing face compatibly configured and adapted for sealable closure; and a compression spring arranged upstream of said valve seat with a first end of said spring in compression against an upstream facing portion of said valve seat, said spring extending further upstream to a second end compressibly engaging against a portion of said valve disk, said compression spring urging said valve disk into a closed position against said valve seat.

8. A filter according to claim 6, wherein the backflow check valve comprises:

a valve seat provided on an interior portion of said annular collar;

a valve disk having a slanted circumferentially arranged sealing face positioned downstream of said valve seat, said valve seat configured and adapted for sealable closure with said valve disk sealing face; and a tension spring with a first end secured to said valve disk and an opposing second end anchored to an upstream portion of said releasable connector, said tension spring operable to pull said valve disk into a closed position against said valve seat.

9. A filter according to claim 1, wherein the top plate has a seal at its axially outer end for sealing the connection between the liquid filter and the mating part.

10. A filter according to claim 1, wherein a backflow check valve membrane is disposed in the area of the displacement space, such that liquid cannot flow out of the replaceable liquid filter when the filter is removed for servicing.

11. A filter according to claim 10, wherein the backflow check valve membrane is permanently connected to the top plate.

12. A filter according to claim 1, wherein the housing inlet communicates with the cylinder head of an internal combustion engine.

* * * * *